(12) United States Patent
Barlier

(10) Patent No.: US 7,097,729 B2
(45) Date of Patent: Aug. 29, 2006

(54) METHOD FOR MAKING MECHANICAL PARTS BY DECOMPOSITION INTO LAYERS

(75) Inventor: Claude Barlier, Coinches (FR)

(73) Assignee: C.I.R.T.E.S. (Centre d'Ingenierie de Recherche et de Transfert de l'Esstin a Saint-Die), Saint Die (FR)

( * ) Notice: Subject to any disclaimer, the term of this patent is extended or adjusted under 35 U.S.C. 154(b) by 0 days.

(21) Appl. No.: 10/826,536

(22) Filed: Apr. 16, 2004

(65) Prior Publication Data

US 2004/0194867 A1 Oct. 7, 2004

Related U.S. Application Data

(63) Continuation of application No. 09/856,311, filed as application No. PCT/FR99/02790 on Nov. 15, 1999, now abandoned.

(30) Foreign Application Priority Data

Nov. 19, 1998 (FR) .................................. 98 14687

(51) Int. Cl.
*B32B 31/00* (2006.01)
(52) U.S. Cl. ....................... 156/256; 156/264
(58) Field of Classification Search ................ 156/250, 156/256, 264, 63
See application file for complete search history.

(56) References Cited

U.S. PATENT DOCUMENTS

| 2,428,658 | A | 10/1947 | Falk et al. |
| 2,477,060 | A | 7/1949 | Hudak |
| 2,479,191 | A | 8/1949 | Williams et al. |
| 2,615,111 | A | 10/1952 | Paquette et al. |
| 3,039,146 | A | 6/1962 | Engel |
| 3,369,272 | A | 2/1968 | Martin, Jr. et al. |
| 3,612,387 | A | 10/1971 | Rathbun |
| 3,790,152 | A | 2/1974 | Parsons |
| 3,932,923 | A | 1/1976 | DiMatteo |
| 4,001,069 | A | 1/1977 | DiMatteo |
| 4,250,727 | A | 2/1981 | Baril et al. |
| 4,338,068 | A | 7/1982 | Suh et al. |
| 4,586,690 | A | 5/1986 | Härtel et al. |

(Continued)

FOREIGN PATENT DOCUMENTS

DE 3711470 10/1988

(Continued)

OTHER PUBLICATIONS

Bocking et al., "Electrochemical Routes for Engineering Tool Production", The GEC Journal of Technology, vol. 14, No. 2, pp. 66 to 74 (1997).

(Continued)

*Primary Examiner*—Jeff H. Aftergut
(74) *Attorney, Agent, or Firm*—Gary M. Cohen

(57) ABSTRACT

A method for making mechanical parts and objects, in particular, prototype parts and objects, from a specific computer-assisted design includes the successive steps of making the parts in elementary layers or strata, reconstructing an assembly of the layers, and assembling the layers. The layers are derived from a previous decomposition of the part along specific planes and in one or several step(s). The unit layers determined by the decomposition of the part include a central portion (8), which effectively corresponds to a layer having the shape and thickness desired for the finished part, an outer portion (11) of substantially the same thickness, surrounding at least portions of the central portion, and frangible bridges (10) linking the central portion (8) and the outer portion (11) together.

12 Claims, 2 Drawing Sheets

U.S. PATENT DOCUMENTS

| | | | |
|---|---|---|---|
| 4,601,652 | A | 7/1986 | Ando et al. |
| 4,675,825 | A | 6/1987 | DeMenthon |
| 4,752,352 | A | 6/1988 | Feygin |
| 4,781,555 | A | 11/1988 | Cook |
| 5,015,312 | A | 5/1991 | Kinzie |
| 5,031,483 | A | 7/1991 | Weaver |
| 5,354,414 | A | 10/1994 | Feygin |
| 5,514,232 | A | 5/1996 | Burns |
| 5,663,883 | A | 9/1997 | Thomas et al. |
| 5,725,891 | A | 3/1998 | Reid, Jr. |
| 5,765,137 | A | 6/1998 | Lee |
| 5,776,409 | A | 7/1998 | Almquist et al. |
| 5,793,015 | A | 8/1998 | Walczyk |
| 5,812,402 | A | 9/1998 | Makiuchi et al. |
| 5,847,958 | A | 12/1998 | Shaikh et al. |
| 5,943,240 | A | 8/1999 | Nakamura |
| 6,136,132 | A | 10/2000 | Kinzie |
| 6,164,115 | A | 12/2000 | Higuchi et al. |
| 6,276,656 | B1 | 8/2001 | Baresich |
| 6,284,182 | B1 | 9/2001 | McNally |
| 6,324,438 | B1 | 11/2001 | Cormier et al. |
| 6,344,160 | B1 | 2/2002 | Holtzberg |
| 6,358,029 | B1 | 3/2002 | Niimi |
| 6,405,095 | B1 | 6/2002 | Jang et al. |
| 6,409,902 | B1 | 6/2002 | Yang et al. |
| 6,544,024 | B1 | 4/2003 | Yim |
| 6,617,601 | B1 | 9/2003 | Wiklund |
| 6,688,871 | B1 | 2/2004 | Lee et al. |
| 6,719,554 | B1 | 4/2004 | Hobson |
| 6,745,446 | B1 | 6/2004 | Barlier |
| 6,921,068 | B1 | 7/2005 | Barlier et al. |
| 6,991,021 | B1 | 1/2006 | Ramirez et al. |
| 7,003,864 | B1 | 2/2006 | Dirscherl |
| 2002/0125613 | A1 | 9/2002 | Cominsky |
| 2002/0162940 | A1 | 11/2002 | Frul et al. |
| 2003/0006001 | A1 | 1/2003 | Yang et al. |
| 2003/0122277 | A1 | 7/2003 | Padovani |
| 2003/0141609 | A1 | 7/2003 | Jia |
| 2004/0173930 | A1 | 9/2004 | Himmer et al. |
| 2004/0173951 | A1 | 9/2004 | Hobson |
| 2004/0217497 | A1 | 11/2004 | Engwall et al. |

FOREIGN PATENT DOCUMENTS

| | | |
|---|---|---|
| DE | 4041105 | 6/1992 |
| EP | 0585502 | 3/1994 |
| EP | 0606627 | 7/1994 |
| EP | 0655317 | 5/1995 |
| EP | 0655668 | 5/1995 |
| EP | 0738583 | 10/1996 |
| EP | 0763417 | 3/1997 |
| EP | 0811457 | 12/1997 |
| EP | 0920946 | 6/1999 |
| FR | 2233137 | 1/1975 |
| FR | 2625135 | 6/1989 |
| FR | 2673302 | 8/1992 |
| FR | 2750064 | 12/1997 |
| FR | 2789187 | 8/2000 |
| FR | 2789188 | 8/2000 |
| FR | 2808896 | 11/2001 |
| FR | 2809040 | 11/2001 |
| FR | 2834803 | 7/2003 |
| FR | 2845492 | 4/2004 |
| GB | 2011814 | 7/1979 |
| WO | WO/9112120 | 8/1991 |
| WO | WO/9508416 | 3/1995 |
| WO | WO/9900234 | 1/1999 |
| WO | WO9911832 | 3/1999 |
| WO | WO/0222341 | 3/2002 |

OTHER PUBLICATIONS

Patent Abstracts of Japan, vol. 016, No. 370 (M-1292) Published: Aug. 10, 1992 (pertaining to JP 04 118221 (Fujitsu Ltd.), published Apr. 20, 1992).

Patent Abstracts of Japan, vol. 1995, No. 11 Published: Dec. 26, 1995 (pertaining to JP 07 214274 (U Mold:KK), published Aug. 15, 1995).

T. Himmer, et al., "Lamination of Metal Sheets", Computers in Industry, Elsevier Science Publishers, Amsterdam, Netherlands, vol. 39, No. 1, pp. 27-33 (Jun. 1999).

T. Polito, "Comment Optimiser le Moulage des Plastiques", ("How to Optimize the Molding of Plastics"), Emballages Magazine, Jan.-Feb. 2002, Supplement No. 605, pp. 56 and 57.

FIG. 4
FIG. 6
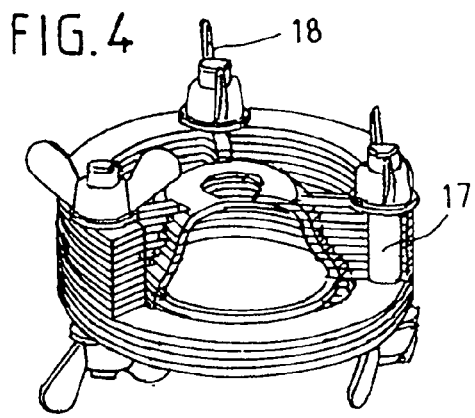
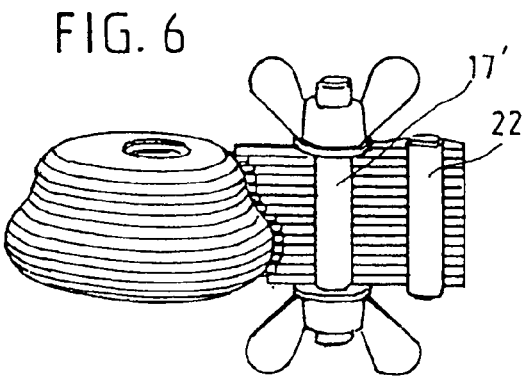
FIG. 5
FIG. 3D
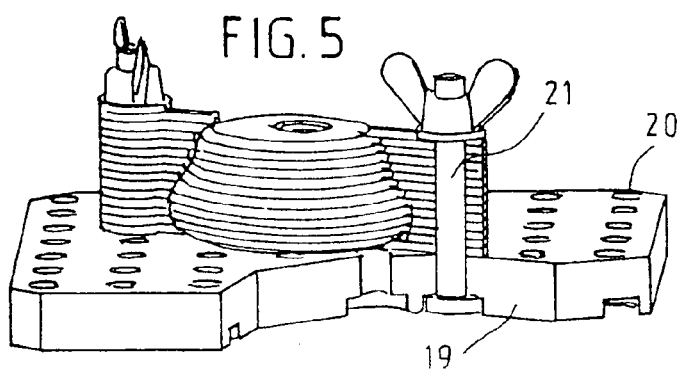
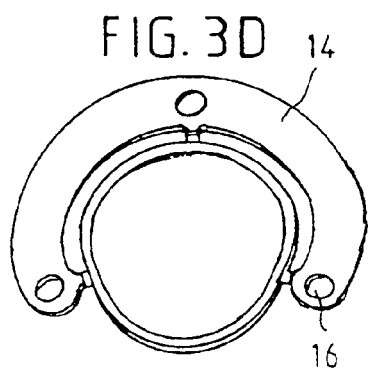
FIG. 7
FIG. 3E
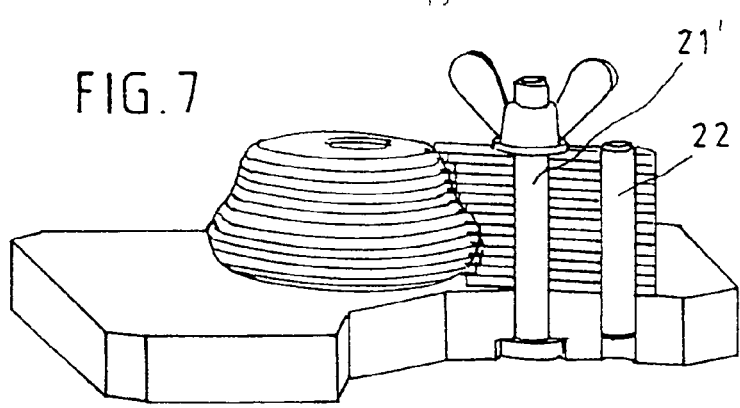
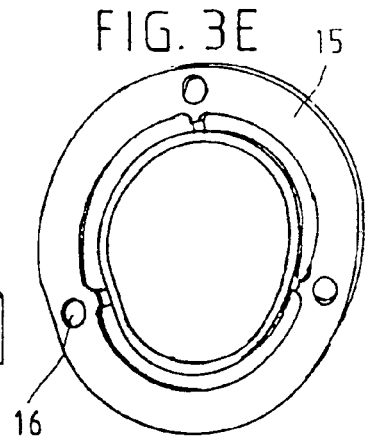
FIG. 8
FIG. 3F
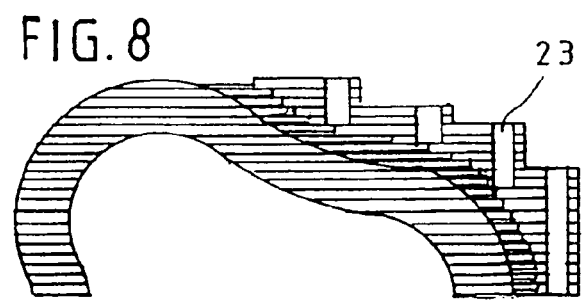
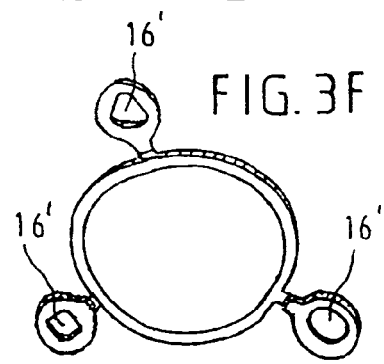

METHOD FOR MAKING MECHANICAL PARTS BY DECOMPOSITION INTO LAYERS

RELATED CASE

This application is a continuation of U.S. patent application Ser. No. 09/856,311, filed Aug. 21, 2001, now abandoned, which is derived from International (PCT) Application No. PCT/FR99/02790, which designated the United States and which was assigned an International Filing date of Nov. 15, 1999.

BACKGROUND OF THE INVENTION

The subject of the present invention is an improvement to methods for producing mechanical parts and objects, particularly prototypes, from a specific computer-aided design, to elemental laminations produced by such methods, and to prototypes obtained by the assembly of such elemental laminations.

Such methods generally comprise a successive series of steps including manufacturing the parts in elemental layers or laminations, building up a collection of the layers, and assembling the layers to form the part, wherein the laminations result from a prior breakdown of the part along plural planes and in one or more defined steps.

One rapid prototyping method of this general type is the subject of European Patent EP-0 585 502-B1, the content of which is incorporated herein by reference, which is known by the name "STRATOCONCEPTION" (a registered trademark).

The "STRATOCONCEPTION" method is entirely satisfactory within the limits of the applications specified in EP-0 585 502-B1, in which the various laminations are essentially positioned and assembled using inserts, the shape and position of which are also determined by specific software. However, because the inserts for the assembly are provided on the inside of the structure, in the case of parts of a certain thickness, the implementation process, which in other respects is very flexible and effective, is somewhat cumbersome. Moreover, it is difficult to provide inserts on the inside of the structure for laminations having a working cross-section (thickness of the final part) which is small. Such small laminations are needed for obtaining very fine, and therefore more precise modeling, or for producing parts whose complex structure entails a breakdown passing through laminations of a very small lateral thickness.

SUMMARY OF THE INVENTION

The object of the present invention is to provide a rapid prototyping method of the type generally described in European Patent EP-0 585 502 that also makes it possible, if required, not to use inserts for internal assembly of the laminations to each other and for positioning the inserts with respect to each other.

According to the present invention, this can be achieved with a method for producing mechanical parts and objects, particularly prototype parts, from a specific computer-aided design which includes the successive steps of manufacturing the parts in elemental layers or laminations, building up the collection of layers, and assembling the layers, wherein the laminations result from a prior breakdown of the part along plural planes and in one or more defined steps. The unitary laminations are determined by a breakdown of the part, employing software, and are machined to include a central portion effectively corresponding to a lamination with the desired shape and desired thickness for obtaining the finished part, an outer portion of roughly the same thickness at least partially surrounding the central portion, and frangible bridges connecting the central and outer portions together. The laminations are then put together, either by superposition or by shoring up the various laminations, so that the outer portions of each lamination form a supporting surround enclosing the reconstructed part, which are connected by the frangible bridges.

It will be understood that the part is broken down and assembled systematically, through the use of the specific software, which automatically positions and provides the bridges, the posts, and the inner or outer inserts, so the positioning and holding inserts are added to the outer surround. The inserts allow the laminations to be positioned indirectly, by mounting and assembly (for example, but without limitation, by bonding). The supporting surround is then easily removed, because of the frangible bridges, once the laminations have been positioned and assembled.

The surround will enclose the final part from the smallest distance, for reasons of precision of assembly and economy of material, which will in all instances necessitate a pressing of the assembly by clamping. This pressing can be external, for example, using a mounting plate, or built in, with the surround being self-supporting.

The invention will be better understood from the description given hereinafter, with reference to the following drawings.

BRIEF DESCRIPTION OF THE DRAWINGS

FIGS. 3A to 3F illustrate alternative forms of the frangible bridges and the outer surrounds.

FIG. 4 illustrates the part shown in FIG. 2 with a self-supporting, holding and assembly structure.

FIG. 5 illustrates an alternative form of the part shown in FIG. 2, with a holding and assembly structure that includes a mounting plate.

FIGS. 6 and 7 illustrate an alternative form of the part shown in FIG. 2, with alternative forms of the assembly structures shown in FIGS. 4 and 5.

FIG. 8 is a partial, cross-sectional view that illustrates one possible assembly, with external inserts, for complex shapes and thin laminations.

DETAILED DESCRIPTION OF THE INVENTION

Figure 1:
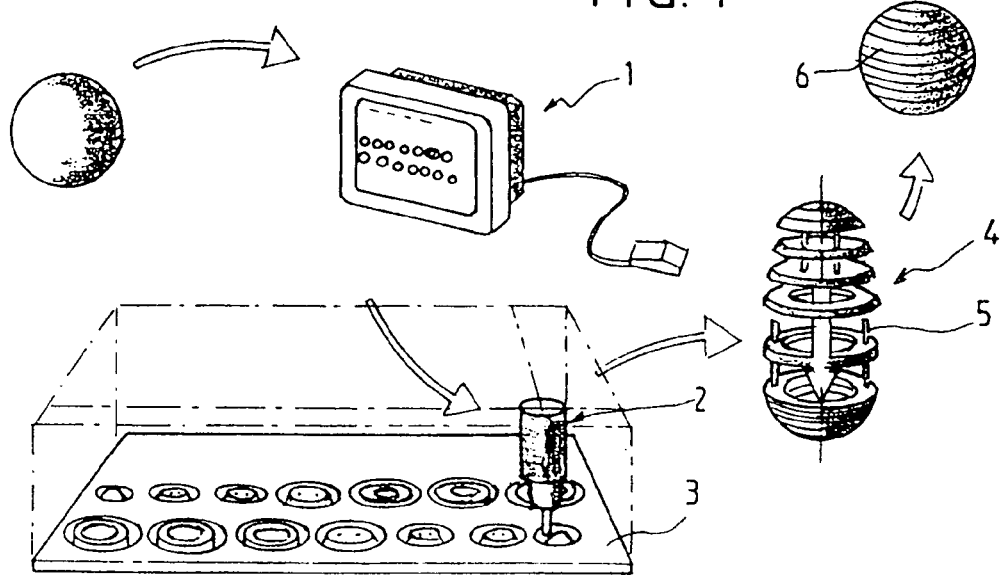
FIG. 1 schematically illustrates implementation of the method known as "STRATOCONCEPTION".

FIG. 1 schematically illustrates a process for producing a mechanical part that is to be prototyped, from a specific, computer-aided design. Using specific software (1), the part that is to be prototyped is cut into laminations. The laminations are machined by rapid micromachining (2), which is controlled by the software (1), from a material (3) in sheet form. The various laminations are assembled into a collection (4) of inserts (5) to finally obtain the prototype (6), after finishing.

The software (1) governs selection of the planes for the slicing/stratification of the laminations, the lamination profiling step, any scaling ratios, the precision and the position for the inserts. Once the various sheet parameters (i.e., dimensions, material, choice of direction, clearance) and the machining parameters (i.e., cutting rate, cutter diameter, etc.) have been input, the entire machining program is transmitted by the software (1) which controls the cutting robot (i.e., the apparatus (2) which performs the micromachining).

Figure 2:
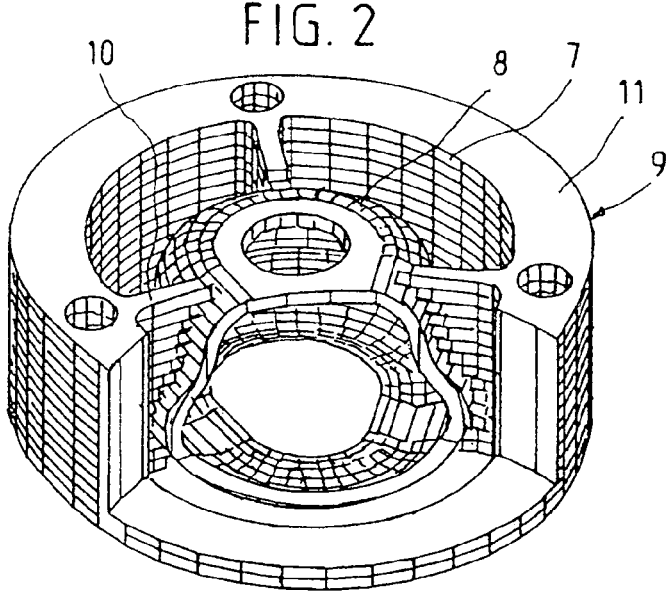
FIG. 2 schematically illustrates a part which has been reconstructed from elemental laminations with an outer surround, in accordance with the present invention.

According to the present invention, and referring now to FIG. 2, the foregoing method makes it possible to obtain a plurality of elemental laminations (7) which, once assembled, reproduce the part to be prototyped (8) connected to an outer surround (9) by bridges (10). It will be understood that, following appropriate assembly, elimination of the surround (9) and of the bridges (10) produces the final prototype part (8).

The laminations (7) can have different and highly varied geometric shapes at the bridges (10), and for the elements (11) that finally form the outer surround (9). Various alternative forms, which are provided as non-limiting examples, are shown in FIGS. 3A to 3F.

Figure 3A:
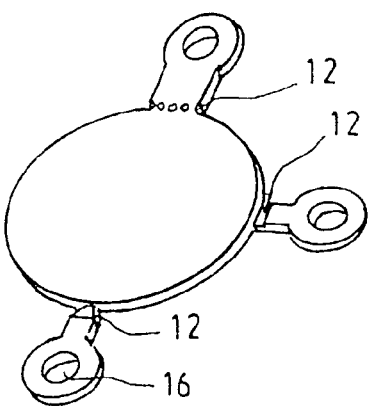

FIG. 3A shows three alternative forms of bridges that can be formed to develop a weakened zone (12), where subsequent cutting will occur.

Figure 3B:
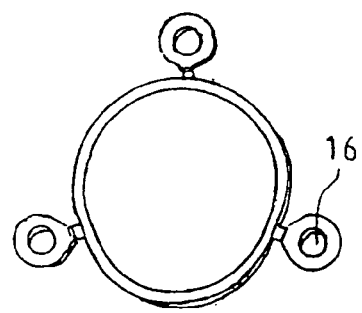

In FIG. 3B, it will be noted that the bridges, in the example shown, three such bridges, can be uniformly distributed around the periphery of the central portion (i.e., in this particular example, at 120°).

Figure 3C:
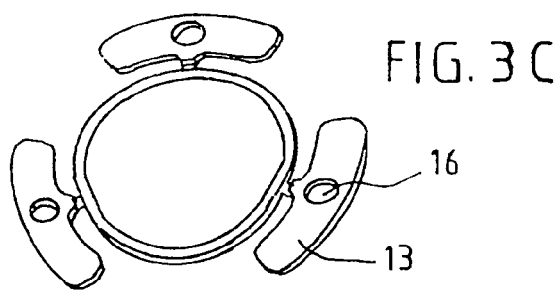

In FIG. 3C, the alternative form shown includes elements (11) that are formed as rounded and enveloping sectors (13).

In FIG. 3D, the three sectors (13) of FIG. 3C are joined together to form a single collar (14).

In FIG. 3E, the single collar (14) of FIG. 3D fully surrounds the part in a ring (15).

Finally, in FIG. 3F, the orifices (16') in each of the elements, which are used to position and to assemble the bridges together, are no longer circular orifices (16), as they were in previous examples. Instead, the orifices (16') have a polygonal geometric cross-section. This then allows the number of orifices in a single lamination to be limited, while providing the same precise positioning.

The laminations are assembled on shafts (17). In FIG. 4, a series of three such shafts (17) are shown. As a non-limiting example, the shafts (17) have wing nuts (18) for clamping an assembly together. In this illustrated example, the structure is self-supporting.

In FIG. 5, two shafts (21) are fixed on a mounting plate (19) equipped with bores (20). Such an assembly can be used when the assembly method is being implemented systematically, for example, for teaching or recreational purposes.

FIGS. 6 and 7 show structures that are identical to the structures shown in FIGS. 4 and 5, except that there is only one shaft (i.e., 17', 21'), and one insert-type rod (22), which is provided for purposes of positioning.

Finally, FIG. 8 illustrates a complex alternative form having inserts (23) which are suitable for extremely thin laminations. For example, each of the inserts (23) can involve only a few contiguous laminations.

As previously indicated, each elemental lamination will be machined by a micromachining process generally known as "STRATOCONCEPTION". If necessary, in the course of the machining process, such machining can include an inversion according to the method which is described in U.S. patent application Ser. No. 09/856,208, which was filed simultaneously herewith and which is expressly incorporated herein by reference.

The method of the present invention allows the manufacture of prototype parts having very complex shapes, very rapidly and at a low cost. The method of the present invention also opens interesting opportunities for teaching and recreational applications.

What is claimed is:

1. A method for producing a mechanical part, including prototype parts, from a specific computer-aided design, comprising the steps of:

manufacturing a plurality of unitary laminations including central portions forming a plurality of elemental layers having a desired shape and a desired thickness for defining the mechanical part, wherein the elemental layers are defined by a prior breakdown of the mechanical part along a plurality of planes, outer portions having substantially the same thickness as the central portions, at least partially surrounding the central portions and including orifices formed therein, and a plurality of frangible bridges connecting the central portions and the outer portions together;

building up the plurality of unitary laminations by engaging the orifices of the outer portions with an aligning element, and forming an assembly of the unitary laminations;

clamping the assembly of the unitary laminations together to form a self-supporting structure, combining the elemental layers defined by the central portions of the unitary laminations and assembling a built up plurality of the elemental layers to produce the mechanical part, and combining the outer portions of the unitary laminations and assembling a built up plurality of the outer portions to produce an outer surround connected to the mechanical part by the frangible bridges; and severing the frangible bridges connecting the built up plurality of the elemental layers which produce the mechanical part and the built up plurality of the outer portions which produce the outer surround, and removing the outer surround formed from the combined outer portions of the unitary laminations from the mechanical part formed from the combined elemental layers forming the mechanical part and separating the mechanical part from the outer surround.

2. The method of claim 1 which further includes the step of forming circular orifices in the outer portions of the unitary laminations, for positioning the unitary laminations and for assembling the unitary laminations together.

3. The method of claim 1 which further includes the step of forming orifices having a polygonal geometric cross section in the outer portions of the unitary laminations, for positioning the unitary laminations and for assembling the unitary laminations together.

4. The method of claim 1 wherein the building up of the plurality of unitary laminations includes the step of assembling the unitary laminations on a mounting plate including bores for engaging the aligning element.

5. The method of claim 1 wherein the building up of the plurality of unitary laminations includes the steps of engaging a first grouping of the orifices formed in the outer portions with an insert rod, and engaging a second grouping of the orifices formed in the outer portions with a single shaft.

6. The method of claim 5 which further includes the step of clamping the outer portions engaged by the single shaft together to secure the assembly of the unitary laminations.

7. A mechanical part, including prototype parts, formed from a specific computer-aided design and which is manufactured by a method comprising the steps of:

manufacturing a plurality of unitary laminations including central portions forming a plurality of elemental layers having a desired shape and a desired thickness for defining the mechanical part, wherein the elemental layers are defined by a prior breakdown of the mechanical part along a plurality of planes, outer portions having substantially the same thickness as the central portions, at least partially surrounding the central portions and including orifices formed therein, and a plurality of frangible bridges connecting the central portions and the outer portions together;

building up the plurality of unitary laminations by engaging the orifices of the outer portions with an aligning element, and forming an assembly of the unitary laminations;

clamping the assembly of the unitary laminations together to form a self-supporting structure, combining the elemental layers defined by the central portions of the unitary laminations and assembling a built up plurality of the elemental layers to produce the mechanical part, and combining the outer portions of the unitary laminations and assembling a built up plurality of the outer portions to produce an outer surround connected to the mechanical part by the frangible bridges; and severing the frangible bridges connecting the built up plurality of the elemental layers which produce the mechanical part and the built up plurality of the outer portions which produce the outer surround, and removing the outer surround formed from the combined outer portions of the unitary laminations from the mechanical part formed from the combined elemental layers forming the mechanical part and separating the mechanical part from the outer surround.

8. The mechanical part of claim 7 wherein the building up of the plurality of unitary laminations includes the step of assembling the unitary laminations on a mounting plate including bores for engaging the aligning element.

9. The mechanical part of claim 7 wherein the building up of the plurality of unitary laminations includes the steps of engaging a first grouping of the orifices formed in the outer portions with an insert rod, and engaging a second grouping of the orifices formed in the outer portions with a single shaft.

10. The mechanical part of claim 9 wherein the building up of the plurality of unitary laminations includes the step of clamping the outer portions engaged by the single shaft together to secure the assembly of the unitary laminations.

11. The mechanical part of claim 7 wherein the manufacturing of the plurality of unitary laminations further includes the step of forming circular orifices in the outer portions of the unitary laminations, for positioning the unitary laminations and for assembling the unitary laminations together.

12. The mechanical part of claim 7 wherein the manufacturing of the plurality of unitary laminations further includes the step of forming orifices having a polygonal geometric cross section in the outer portions of the unitary laminations, for positioning the unitary laminations and for assembling the unitary laminations together.

* * * * *